US012399816B1

(12) United States Patent
Dutta et al.

(10) Patent No.: US 12,399,816 B1
(45) Date of Patent: Aug. 26, 2025

(54) DATA STORAGE DEVICE AND METHOD FOR DATA ROUTING FOR WEAR LEVELLING IN MULTI-META-DIE DATA STORAGE DEVICES

(71) Applicant: Sandisk Technologies, Inc., Milpitas, CA (US)

(72) Inventors: Bishwajit Dutta, Bangalore (IN); Sharath Shivakumar, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/590,503

(22) Filed: Feb. 28, 2024

(51) Int. Cl.
*G06F 12/02* (2006.01)

(52) U.S. Cl.
CPC .. *G06F 12/0246* (2013.01); *G06F 2212/7205* (2013.01); *G06F 2212/7211* (2013.01)

(58) Field of Classification Search
None
See application file for complete search history.

(56) References Cited

U.S. PATENT DOCUMENTS

| | | | |
|---|---|---|---|
| 9,959,067 B2 * | 5/2018 | Yang | G06F 3/064 |
| 2013/0013852 A1 * | 1/2013 | Hou | G11C 16/00 711/E12.008 |
| 2016/0357474 A1 * | 12/2016 | Frid | G06F 3/0683 |
| 2017/0017588 A1 * | 1/2017 | Frid | G06F 3/061 |
| 2017/0123664 A1 * | 5/2017 | Parker | G06F 3/0616 |
| 2017/0168716 A1 * | 6/2017 | Shaharabany | G06F 3/0679 |
| 2020/0334144 A1 * | 10/2020 | Byun | G06F 3/0655 |
| 2022/0269603 A1 * | 8/2022 | Ravimohan | G06F 12/0261 |
| 2022/0300212 A1 * | 9/2022 | Shin | G06F 12/0246 |

* cited by examiner

*Primary Examiner* — Stephanie Wu
(74) *Attorney, Agent, or Firm* — Crowell & Moring LLP (57) ABSTRACT

A multi-meta-die data storage device disclosed herein routes host writes in such a way to prevent the need for inter-meta-die active wear leveling. In making the meta-die selection, a controller of the data storage device can consider both the average number of program-erase cycles (PEC) of the meta-die, as well as a parameter that indicates the effort required to relocate data from the meta-die to another meta-die. The controller can use this information to normalize PEC among the meta-dies and select the meta-die with the lowest final relocation effort for opening a new block for host writes. This can minimize relocations from active wear leveling.

18 Claims, 5 Drawing Sheets

DATA STORAGE DEVICE AND METHOD FOR DATA ROUTING FOR WEAR LEVELLING IN MULTI-META-DIE DATA STORAGE DEVICES

BACKGROUND

Due to increased demand for higher-capacity storage products, the number of memory dies in a data storage device is increasing. However, in many situations, only a sub-set of memory dies can operate in parallel due to power and/or thermal limitations.

DETAILED DESCRIPTION

The following embodiments generally relate to a data storage device and method for data routing for wear levelling in multi-meta-die data storage devices. In one embodiment, a data storage device is provided comprising a memory and one or more processors. The memory comprises a plurality of memory dies organized into a plurality of meta-dies, wherein each meta-die comprises two or more memory dies that operate in parallel. The one or more processors, individually or in combination, are configured to: determine an average number of program-erase cycles (PEC) of each of the plurality of meta-dies; determine an effort required to relocate data from each of the plurality of meta-dies; and based on the average number of program-erase cycles of each of the plurality of meta-dies and the effort required to relocate data from each of the plurality of meta-dies, select a meta-die from the plurality of meta-dies in which to open a new block to write data.

In another embodiment, a method is provided that is performed in a data storage device comprising a memory comprising a plurality of memory dies organized into a plurality of meta-dies, wherein each meta-die comprises two or more memory dies that operate in parallel. The method comprises: selecting a meta-die from the plurality of meta-dies in which to write data, wherein, among the plurality of meta-dies, the selected meta-die is least-likely to require data relocation; and writing the data in the selected meta-die.

In yet another embodiment, a data storage device is provided comprising: a memory comprising a plurality of memory dies organized into a plurality of meta-dies, wherein each meta-die comprises two or more memory dies that operate in parallel; and means for selecting a meta-die from the plurality of meta-dies in which to write host data, wherein, among the plurality of meta-dies, the selected meta-die is least-likely to require inter-meta-die active wear leveling.

Other embodiments are possible, and each of the embodiments can be used alone or together in combination. Accordingly, various embodiments will now be described with reference to the attached drawings.

EMBODIMENTS

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Figures 1A, 1B:
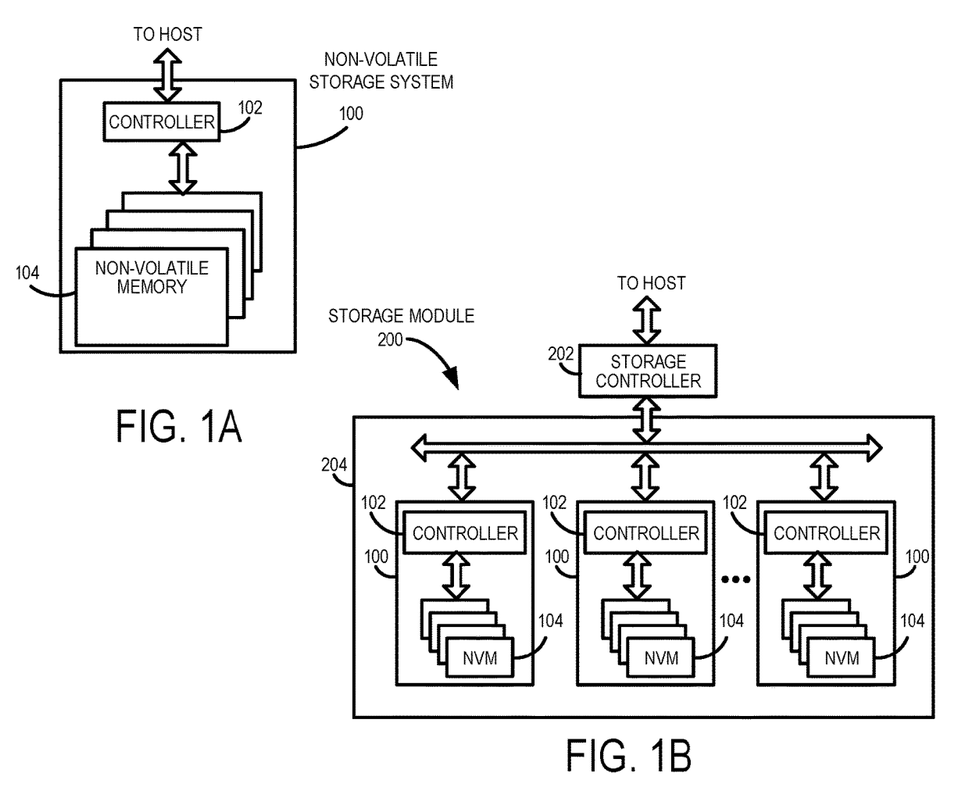
FIG. 1A is a block diagram of a data storage device of an embodiment.
FIG. 1B is a block diagram illustrating a storage module of an embodiment.
Figure 1C:
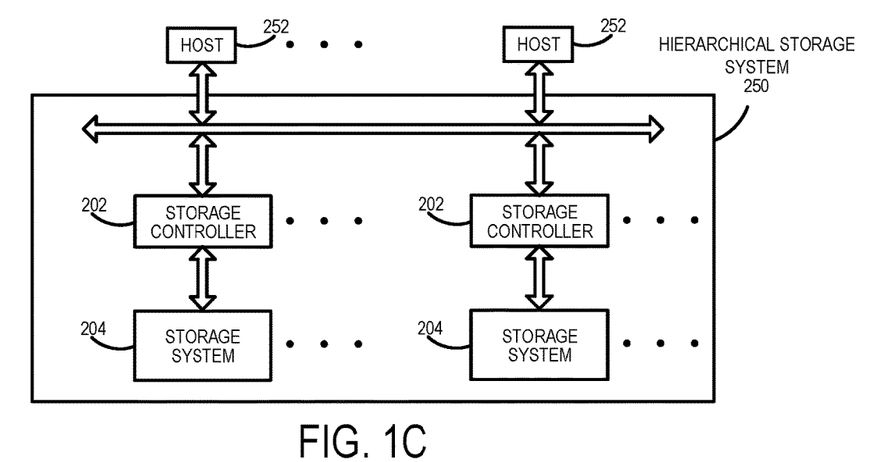
FIG. 1C is a block diagram illustrating a hierarchical storage system of an embodiment.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
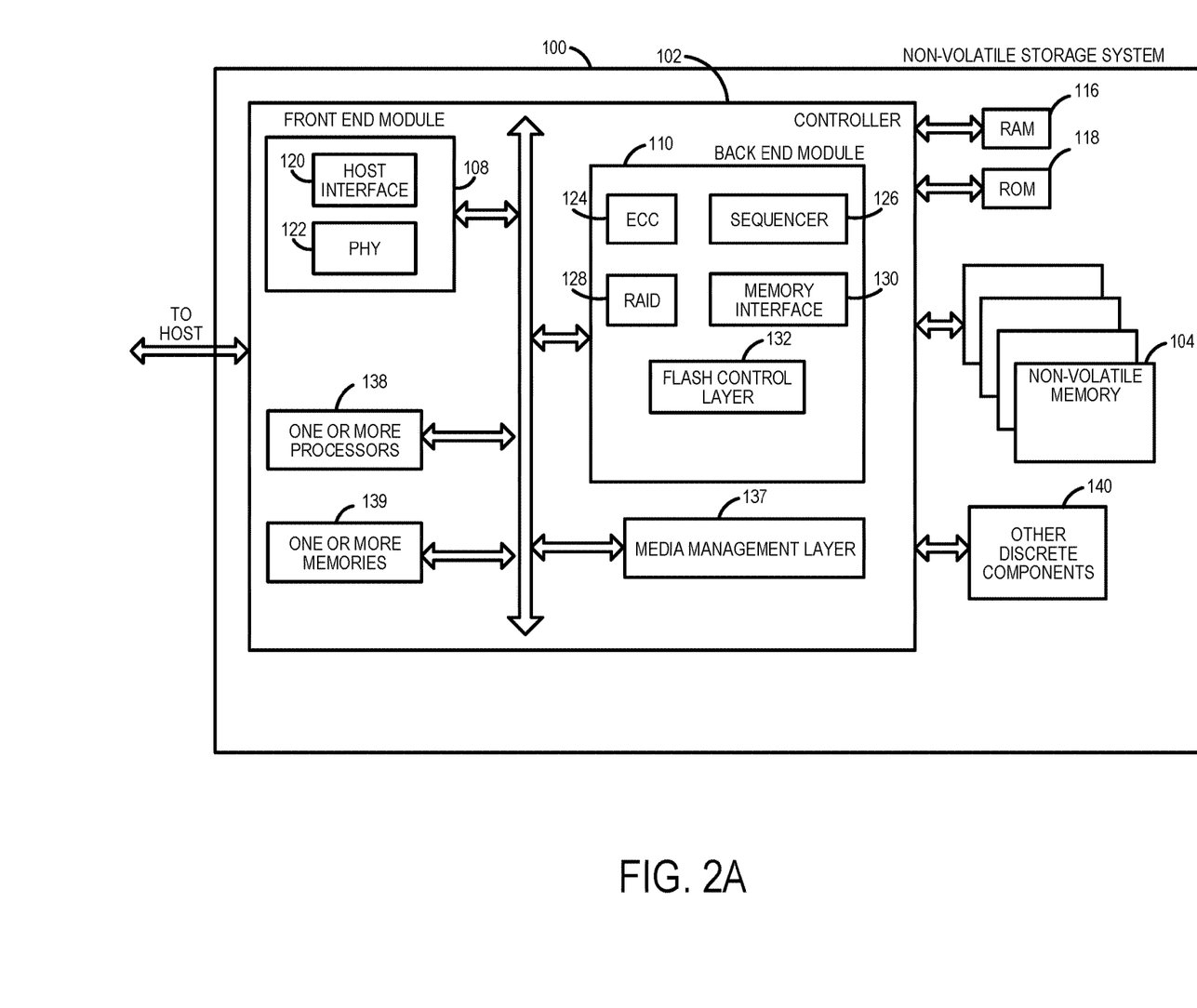
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
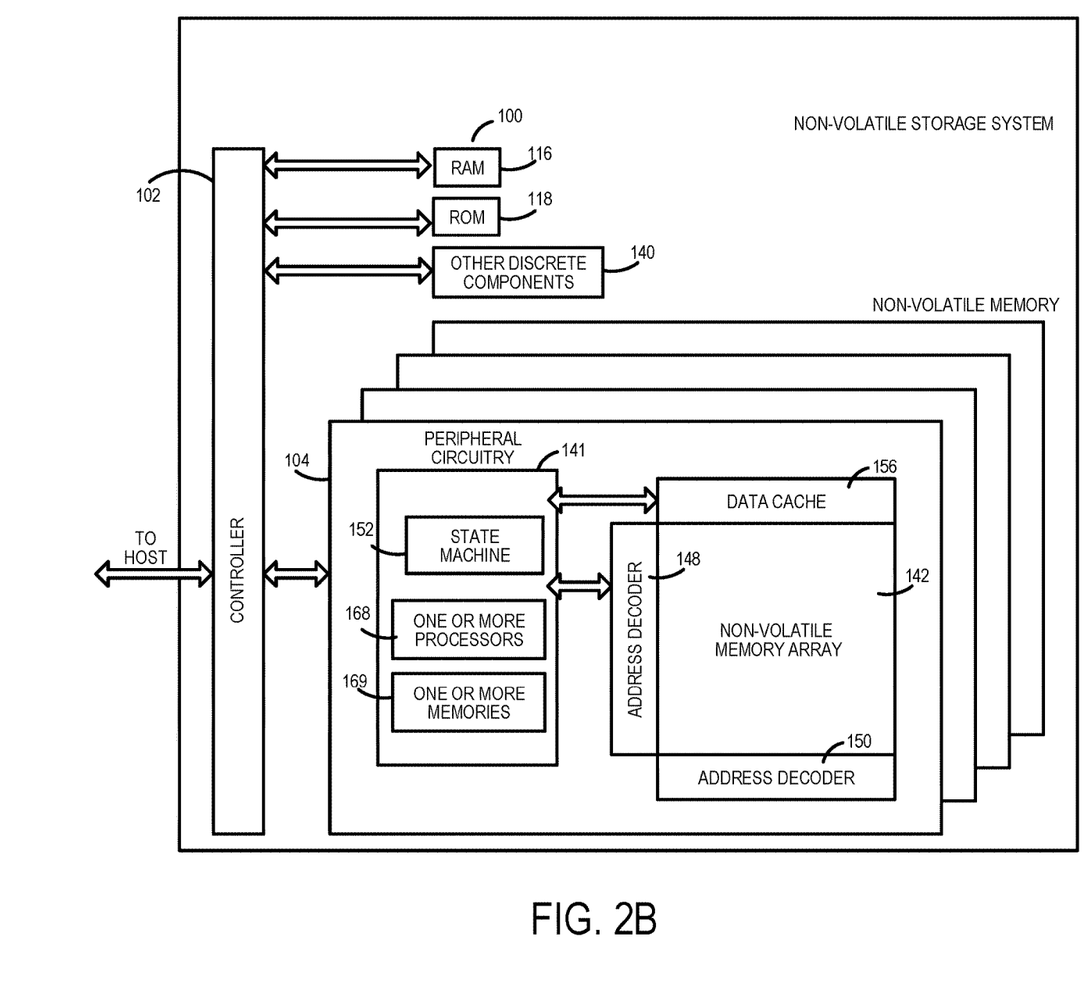
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
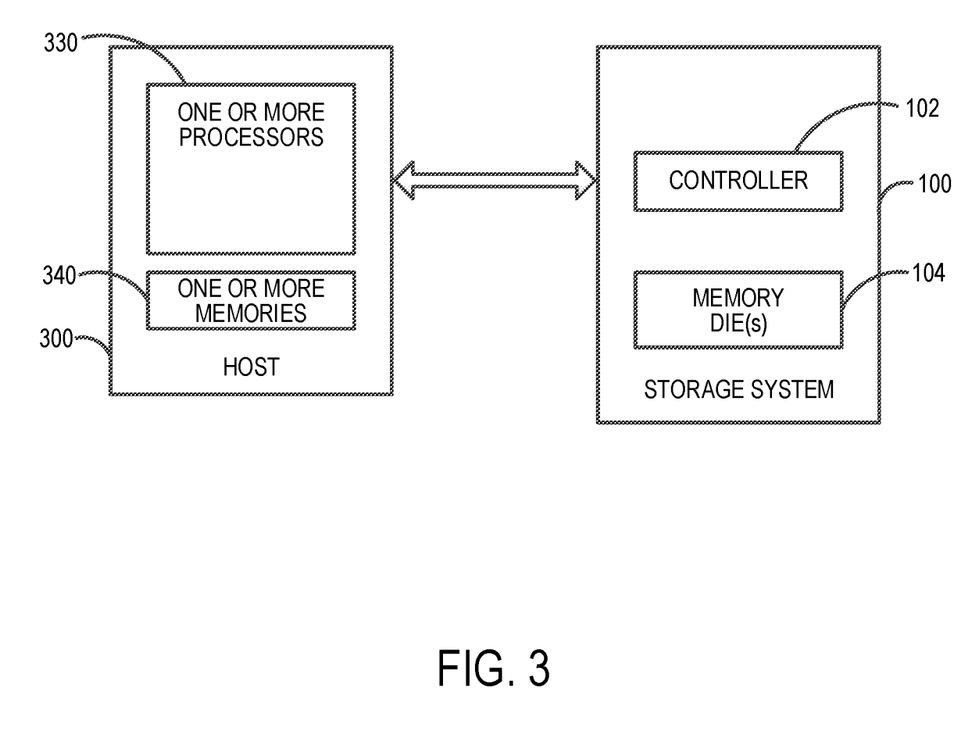
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, due to increased demand for higher-capacity storage products, the number of memory dies in a data storage device is increasing. However, in many situations, only a sub-set of memory dies can operate in parallel due to power and/or thermal limitations. A "meta-die" can refer to a sub-set of memory dies that can operate in parallel. In some situations, a meta-die is the maximum number of memory dies that can operate in parallel. A data storage device can have multiple meta-dies. For example, in a data storage device with 64 memory dies, 16 memory dies may be grouped together as a meta-die, resulting in the system having four meta-dies. Each meta-die can be treated as an independent sub-system having its own group allocation table (GAT) blocks (with logical-to-physical address maps), host blocks, relocation blocks, etc.

As will be explained in more detail below, in a multi-meta-die data storage device, it may be desired to route host writes in such a way to prevent the need for inter-meta-die active wear leveling. In one embodiment, the controller 102 does this by selecting the meta-die in which to open a new block for the writing host data in such a way that will minimize data relocations. In one example implementation (other implementations can be used), in making the meta-die selection, the controller 102 considers both the average number of program-erase cycles (PEC) of the meta-die, as well as a parameter (referred to herein as "VCr_av") that indicates the effort required to relocate data from the meta-die to another meta-die (e.g., in terms of the average validity count (VC) of relocation sources to free up an equivalent block when the host 300 opens a new block for a write). A look-up table (LUT) (e.g., per meta-die) can be used to determine the relocation effort. The controller 102 can select the meta-die with the lowest final relocation effort for opening a new block for host writes. In this way, the controller 102 can attempt to normalize PEC and then select which meta-die to use to minimize relocations (e.g., from active wear leveling). The following paragraphs will describe this embodiment in more detail.

The controller 102 can be configured to perform various memory management functions. For example, the controller 102 can be configured to perform wear levelling, which helps ensure uniform program-erase cycles (PEC) of different memory areas (e.g., blocks of memory across various memory dies ("meta-blocks') to avoid the risk of capacity decrease due to over-cycling). One example of wear levelling is passive wear levelling, which does not involve data movement. In passive wear leveling, the controller 102 can employ a first-in-first-out (FIFO) queue for free blocks, wherein blocks are allocated from the head of the FIFO queue, and erased/invalid blocks are inserted into the tail of the FIFO queue. Passive wear leveling is typically sufficient for a small single-level cell (SLC) cache pool in multi-level cell (MLC) (e.g., triple-level cell (TLC) or quad-level cell (QLC)) devices. Another example of wear leveling is active wear leveling, which involves data movement and can be expensive. Active wear leveling can be triggered when the PEC of a block falls below an average PEC by a threshold. In some implementations, a main data partition employs both passive and active wear leveling. However, data movement across meta-dies in a multiple meta-die (MMD) device can be expensive as it may involve copying data to volatile memory (e.g., transfer RAM (TRAM)) which can be a bottleneck in low-cost devices, flushing the memory-die latches to clear them, and then power switching to another meta-die to make it the active memory die.

The controller 102 can also be configured to fold data between an MLC block (e.g., a TCL block) and SLC blocks. The controller 102 can select a relocation source for compaction by selecting the MLC block with the smallest valid count (VC) of data. If an intermediate VC block is not selected for a relatively-long time, active wear leveling can take care of it.

Additionally, the controller 102 can be configured to perform garbage collection. In one example, the main partition of memory is divided into three or four modes based on the free space available. The maximum free space available is in burst mode where no garbage collection happens. In a sustained mode (SM), the garbage collection gets balanced with host writes. In urgent mode (UM) and super-urgent modes (SU), the host 300 can gets progressively throttled. An SLC partition can have such modes separate from the main partition. However, in the examples presented herein, the focus in on the main partition zones. In some embodiments, garbage collection is done on the meta-die on which the host write is ongoing to avoid meta-die switch overhead. Also, in some embodiments, the meta-dies will continuously move between the various modes as garbage collection happens.

In a multi-meta-die device, the host's input-output (IO) pattern can lead to uneven PECs between meta-dies, which can lead to expensive data movement between meta-dies. For example, if a host continuously writes to a meta-die and then invalidates the data, the meta-die will have the lowest number of VC blocks and will always be selected over the other meta-dies. This can lead to a high PEC in the other meta-dies, which can trigger active wear leveling to even out the average PECs.

The embodiments presented herein can be used to address this problem. In general, these embodiments can be used to reduce or eliminate the need for inter-meta-die active wear leveling via intelligent routing of host writes (e.g., by meta-die selection to open a new block) while minimizing relocations and boosting performance by considering: (1) the relocation effort to free up an equivalent block, which is the average VC of relocation sources required to free up a single block, (2) the device mode based on the free space, which enables preferential selection of the meta-die in burst mode over the meta-die in super-urgent mode (SU), and/or (3) the average PEC of the meta-dies. In one embodiment, only one MLC block will be open in an active meta-die for host writes, which can be separated out from the SLC control blocks. Similarly, an additional MLC block can be opened only in the active meta-die. The block address and how many times the block was erased can be tracked and recorded.

In one example implementation, the controller 102 is configured to select the best meta-die to route host data using the average PEC of meta-die a parameter ("VCr_av") that captures the relocation effort needed. As used herein, VCr_av refers to the average VC of relocation sources to free up an equivalent block when the host 300 opens a new block for a write. A factor based on the garbage collection mode can be multiplied/added to VCr_av for an "effective VCr_av" calculation for decision making. This enables preferential selection of a meta-die in burst mode compared to a meta-die in super-urgent garbage collection mode. The PEC delta of each meta-die can be calculated by subtracting average PEC of the meta-die from the average PEC of the meta-die with the highest average PEC. A data structure, such as a look-up table, can be used for weight look-up for each meta-die based on the PEC delta bucket it falls in. This can be used to compute the final relocation effort for a meta-die. The meta-die with the lowest final relocation effort can be selected for opening a new block for host writes. Additionally, a random factor can be added to introduce certain randomness in meta-die section to avoid malicious actors to cause wear-leveling breakdown by exploiting the knowledge of the proposed algorithm.

It should be noted that an SLC block can have a very high PEC (e.g., up to 100K), but the PEC can be much lower for a TLC/QLC pool in direct-write devices. Therefore, these embodiments can be in the context of host data routing to the main partition. Also, these embodiments can support existing wear-leveling schemes within a meta-die.

The following is a discussion of one example implementation. It should be understood that this is merely an example and that other implementations can be used. In this example implementation, for a newly-formatted drive, the controller 102 can switch alternatively between meta-dies to open new block for host writes. When a garbage collection threshold is hit, which can be at same time for all meta-dies, the controller 102 can select the meta-die to open a new block using the below logic.

First, the controller 102 can calculate VCr_av for each meta-die and find the effort in relocation/TLC compaction to free up a block. This can be accomplished by soring the blocks in a meta-die with respect to VC, counting the number of blocks so that invalidity adds to 100% starting from the lowest VC block (this is the number for blocks to relocate to free up one full block), and calculating the average VC of these subsets of blocks, which is VCr_av (i.e., VC relocation (r) average). For example, in a two meta-die device, meta-die 1 has two VC blocks with 40% and 50%. Therefore, two block relocations free up 110% space, and VCr_av=45%. Meta-die 2 has blocks of 60%, 60%, and 60% and, therefore, needs three blocks to free up 120% of space (VCr_av=60%.) Note that the above compaction-source-selection scheme still accommodates closing of a relocation block with a host block.

To calculate the effective VCr_av, the main partition of the memory 104 can be in BM, SM, UM, and SU modes based on free-space availability. It may be preferred to select the meta-die in burst mode (BM) compared to the one in SU mode because the one in BM gives the best performance (as there is no garbage collection), whereas the meta-die in SU will give the worst performance because of the highest level of throttling. Therefore, it can be better to wait for the VC of the meta-die in SU mode to drop due to host invalidation (average PEC consideration between meta-dies can take care that the wait is not indefinite).

The following is an example of a multiplier look-up table (LUT) for effective VCr_av. The lower the value implies a greater chance of selection.

| Meta-die Mode | VCr_av Multiplier |
| --- | --- |
| Burst | 1 |
| Sustained | 1.05 |
| Urgent | 1.1 |
| Super Urgent | 2 |

The average PEC of meta-dies can be considered. The controller 102 can get the average PEC of each meta-die and find the meta-die with the highest average ("MaxPECav") and take it as the base. For each meta-die, the controller 102 can find the PEC delta by subtracting its PEC from Max-PECav. The controller 102 can find the final VCr_av for each meta-die by looking up the weightage and constant factor from a look-up table. The following is an example of PEC delta bucket versus VC weightage:

| PEC Delta Bucket | VCr_av Weightage | Constant Factor |
| --- | --- | --- |
| 0-5 | 1000 (use 100VCr_av + 1) | 10 |
| 6-10 | . . . | 9 |
| 11-15 | . . . | . . . |
|  | . . . | . . . |
| . . . -Max | 1 | 1 |

The final VCr_av=Weight*(effective VCr_av)+Constant Factor. In this example, a smaller constant factor is used to handle a host data pattern where it invalidates 100% of the data, thus making the VCr_av=0 and, thus, automatically selecting meta-dies with the higher PEC as candidates. When opening new block for a host write, the controller 102 can select, among the meta-dies, the meta-die with the lowest least final VCr_av. It should be noted that the above method can still work if, for some optimizations, the host 300 opens a new block in the same meta-die. In such scenarios, this consideration can be secondary in decision making. It should also be noted that relatively-high PEC blocks (e.g., as compared to an average) within a block can be handled by wear leveling within a meta-die.

Also, a malicious agent (or an extreme workload) may detect the data routing pattern and create a workload that keeps all data valid in one meta-die while invalidating the data in the other meta-dies, thereby causing the other meta-die to over cycle. A random factor can be added to the final VCr_av equation to tackle this via occasional deviation in meta-die allocation compared to the algorithm discussed above.

Figure 4:
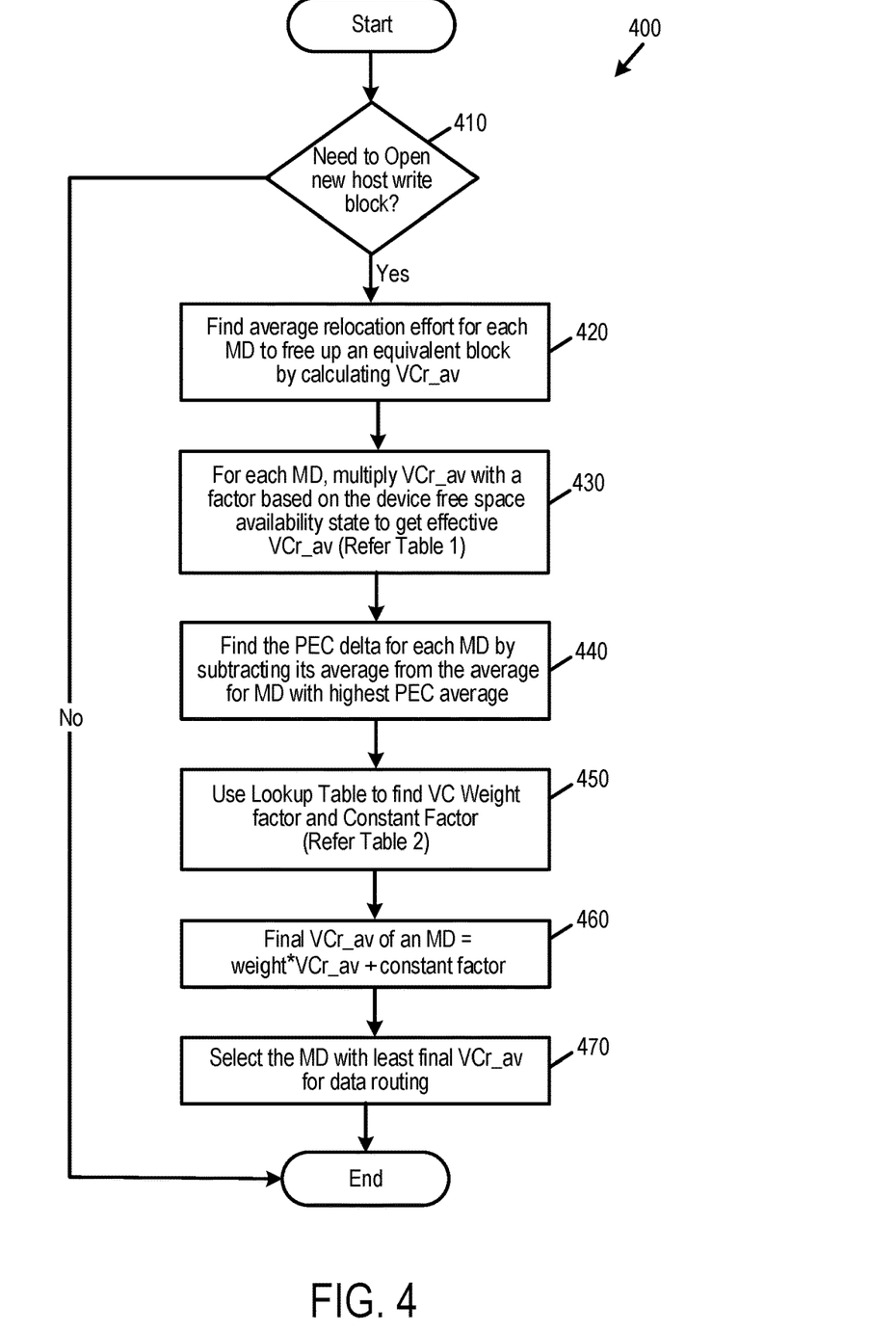
FIG. 4 is a flow chart of a method of an embodiment for data routing for wear levelling in multi-meta-die data storage devices.

FIG. 4 is a flow chart 400 of a method of an embodiment for data routing for wear levelling in multi-meta-die data storage devices. As shown in FIG. 4, the controller 102 of the data storage device 100 determines if there is a need to open a new host write block (act 410). If there is no need, the method ends. However, if there is a need, the controller 102 finds the average relocation effort for each meta-die to free up an equivalent block by calculating VCr_av (act 420). Then, for each meta-die, the controller 102 multiplies VCr_av by a factor based on the device free space availability state to get an effective VCr_av (see, e.g., the first table above) (act 430). The controller 102 then finds the PEC delta for each meta-die by subtracting its average from the average for the meta-die with the highest PEC average (act 440). Next, the controller 102 uses the look-up table to find the VC weight factor and constant factor (see, e.g., the second table above) (act 450). After that, the controller 102 calculates the final VCr_av of a meta-die, per the following equation: MD=weight*VCr_av+constant factor (act 460). Finally, the controller 102 selects the meta-die with the lower final VCr_av for data routing (act 470). Of course, these is merely one example implementation, and other implementations can be used.

There are several advantages associated with these embodiments. For example, these embodiments can capture key parameters of PEC, relocation effort, and device state. Using look-up tables (LUTs) (which can be filled up by heuristics, simulation, statistical methods, machine learning, etc. for maximal benefits) can avoid CPU-expensive potential optimization algorithms. For example, these embodiments can be computationally inexpensive, as only one application program interface (API) may be called to get the meta-die number to allocate the host block. Also, in practice, simple heuristics-based LUT values can be sufficient to cover many situations. Also, these embodiments can provide better performance and endurance, as well as reduce write amplification due to the reduction or elimination of active wear leveling. The look-up tables can be used directly in code, and a complete look-up table may only be needed if looking for a very uniform PEC balance between the meta-dies.

Further, multi-meta-die data storage devices are relatively new and on the cusp of high growth, as otherwise high capacity storage is difficult in handheld products due to the power envelope. Also, active wear leveling across meta-dies can be very expensive compared to within a meta-die. These embodiments can be used to address this issue. Also, these embodiments can be used in data storage devices other than multi-meta-die data storage devices. For example, these embodiments can be used with multiple data storage devices having the goal of the reaching end-of-life at a similar time (e.g., RAID storage when used in a configuration other than RAID 1, NAS storage). In these environments, a data storage device can share its average PEC, relocation effort, and device state information with the host, and the host can choose which data storage device in which to open a block to write for uniform wear leveling.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
 a memory comprising a plurality of memory dies organized into a plurality of meta-dies, wherein each meta-die comprises two or more memory dies that operate in parallel; and
 one or more processors, individually or in combination, configured to:
  receive data from a host to be written in the memory, wherein writing the data in the memory requires a new block to be opened in the memory;
  determine which meta-die from the plurality of meta-dies in which to open the new block to write the data received from the host by:
   determining an average number of program-erase cycles (PEC) of each of the plurality of meta-dies;

for each meta-die, determining an effort required to relocate data from that meta-die to another meta-die to free up space to create the new block; and based on the average number of program-erase cycles of each of the plurality of meta-dies and the effort required to relocate data from each of the plurality of meta-dies, selecting a meta-die from the plurality of meta-dies in which to open the new block to write data received from the host; and write data received from the host in the new block.

2. The data storage device of claim 1, wherein the selecting is further based on a mode of the data storage device.

3. The data storage device of claim 2, wherein the mode comprises a burst mode, a sustained garbage collection mode, an urgent garbage collection mode, and/or a super-urgent garbage collection mode.

4. The data storage device of claim 1, wherein the effort required to relocate data from each of the plurality of meta-dies is determined by an average validity count of relocation sources to free up an equivalent block.

5. The data storage device of claim 1, wherein the effort required to relocate data from each of the plurality of meta-dies is determined using a look-up table.

6. The data storage device of claim 1, wherein among the plurality of meta-dies, the selected meta-die is least-likely to require inter-meta-die active wear leveling.

7. The data storage device of claim 1, wherein each meta-die comprises a maximum number of memory dies that can operate in parallel.

8. The data storage device of claim 1, wherein each meta-die is an independent sub-system with respect to the other meta-dies of the plurality of meta-dies.

9. The data storage device of claim 1, wherein each meta-die comprises its own group allocation table (GAT) blocks, host blocks, and/or relocation blocks.

10. The data storage device of claim 1, wherein the memory comprises a three-dimensional memory.

11. In a data storage device comprising a memory comprising a plurality of memory dies organized into a plurality of meta-dies, wherein each meta-die comprises two or more memory dies that operate in parallel, a method comprising:

receiving data from a host to be written in the memory, wherein writing the data in the memory requires a new block to be opened in the memory;

determining which meta-die from the plurality of meta-dies in which to open the new block to write the data received from the host by:

determining an average number of program-erase cycles (PEC) of each of the plurality of meta-dies;

for each meta-die, determining an effort required to relocate data from that meta-die to another meta-die to free up space to create the new block; and based on the average number of program-erase cycles of each of the plurality of meta-dies and the effort required to relocate data from each of the plurality of meta-dies, selecting a meta-die from the plurality of meta-dies in which to open the new block to write the data received from the host; and writing the data received from the host in the new block.

12. The method of claim 11, wherein the effort required to relocate data from each of the plurality of meta-dies is determined by an average validity count.

13. The method of claim 11, wherein the meta-die is selected by considering a mode of the data storage device.

14. The method of claim 13, wherein the mode comprises a burst mode, a sustained garbage collection mode, an urgent garbage collection mode, and/or a super-urgent garbage collection mode.

15. The method of claim 11, wherein each meta-die comprises a maximum number of memory dies that can operate in parallel.

16. The method of claim 11, wherein each meta-die is an independent sub-system with respect to the other meta-dies of the plurality of meta-dies.

17. The method of claim 11, wherein the memory comprises a three-dimensional memory.

18. A data storage device comprising:

a memory comprising a plurality of memory dies organized into a plurality of meta-dies, wherein each meta-die comprises two or more memory dies that operate in parallel; and means for:

receiving data from a host to be written in the memory, wherein writing the data in the memory requires a new block to be opened in the memory;

determining which meta-die from the plurality of meta-dies in which to open the new block to write the data received from the host by:

determining an average number of program-erase cycles (PEC) of each of the plurality of meta-dies;

for each meta-die, determining an effort required to relocate data from that meta-die to another meta-die to free up space to create the new block; and based on the average number of program-erase cycles of each of the plurality of meta-dies and the effort required to relocate data from each of the plurality of meta-dies, selecting a meta-die from the plurality of meta-dies in which to open the new block to write the data received from the host; and writing the data received from the host in the new block.

* * * * *